United States Patent [19]
Honkasalo et al.

[11] Patent Number: 6,005,857
[45] Date of Patent: Dec. 21, 1999

[54] METHOD AND ARRANGEMENT FOR HIGH-SPEED DATA TRANSMISSION IN TDMA MOBILE TELECOMMUNICATIONS SYSTEM

[75] Inventors: Zhi-Chun Honkasalo; Harri Honkasalo, both of Bedford, Tex.; Harri Jokinen, Hiisi; Harri Posti, Oulu, both of Finland

[73] Assignees: Nokia Telecommunications, Oy., Espoo; Nokia Mobile Phones, Ltd., Salo, both of Finland

[21] Appl. No.: 08/737,447

[22] PCT Filed: May 10, 1995

[86] PCT No.: PCT/FI95/00248

§ 371 Date: Nov. 8, 1996

§ 102(e) Date: Nov. 8, 1996

[87] PCT Pub. No.: WO95/31878

PCT Pub. Date: Nov. 23, 1995

[30] Foreign Application Priority Data

May 11, 1994 [FI] Finland ..................... 942190

[51] Int. Cl.[6] ............... H04B 7/212; H04B 7/26
[52] U.S. Cl. ............... 370/337; 370/347
[58] Field of Search ............... 370/337, 347, 370/311, 329; 371/32

[56] References Cited

U.S. PATENT DOCUMENTS

| | | |
|---|---|---|
| 4,805,167 | 2/1989 | Leslie et al. . |
| 4,905,226 | 2/1990 | Kobayashi . |
| 5,446,739 | 8/1995 | Nakano et al. ............ 370/337 |
| 5,535,429 | 7/1996 | Bergenlid et al. .......... 370/329 |
| 5,563,895 | 10/1996 | Malkamaki et al. ........ 371/32 |
| 5,570,369 | 10/1996 | Jokinen ..................... 370/79 |

FOREIGN PATENT DOCUMENTS

| | | |
|---|---|---|
| 516 373 | 12/1992 | European Pat. Off. . |
| 0 671 824 A1 | 3/1994 | European Pat. Off. . |
| 91/14319 | 9/1991 | WIPO . |

*Primary Examiner*—Chi H. Pham
*Assistant Examiner*—Maikhanh Tran
*Attorney, Agent, or Firm*—Pillsbury Madison & Sutro LLP

[57] ABSTRACT

A method and arrangement for high-speed data transmission in a TDMA mobile telecommunications system. A high-speed data signal is split into at least two signals of lower speed prior to transmission over a radio path. At least two time slots for each frame are allocated for a mobile station. The time slots from each frame correspond to a number of the signals of lower speed. Modulation and burst building operations are carried out separately for each of the signals of lower speed. Data is transmitted over the radio path between the mobile station and a base station as bursts in a time slot allocated to the mobile station by successive frames, so that each of the signals of lower speed is transmitted in a different one of the time slots.

13 Claims, 4 Drawing Sheets

METHOD AND ARRANGEMENT FOR HIGH-SPEED DATA TRANSMISSION IN TDMA MOBILE TELECOMMUNICATIONS SYSTEM

BACKGROUND OF THE INVENTION

1. Field of the Invention

The present invention relates to a method for improving data transmission in a mobile telecommunications system, using the method, data is transmitted over the radio path between a mobile station and a base station as bursts within time slots allocated to the mobile station in successive frames.

2. Description of the Related Art

In mobile telecommunications systems of a time division multiple access (TDMA) type, time division communication in the radio path takes place in successive TDMA frames, each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out. The Pan-European mobile system GSM (Global System for Mobile Communications) is an example of a TDMA radio system.

For communication in conventional TDMA systems, each mobile station is assigned one time slot of a traffic channel for data or speech transmission. Thus, a GSM system, for example, can have as much as eight simultaneous connections to different mobile stations on a same carrier frequency. The maximum data transfer rate on a traffic channel is restricted to a relatively low level according to the bandwidth in use as well as channel coding and error correction, for example in a GSM system to 9.6 kbit/s or 12 kbit/s. In addition, in a GSM system a half-speed traffic channel (max. 4.8 kbit/s) can be chosen for low speeds of speech coding. The half-speed traffic channel is established when a mobile station communicates in a specific time slot only in every second frame, in other words, in half-speed. A second mobile station communicates in every second frame in the same time slot. This is how the capacity of the system can be doubled as far as the number of subscribers is concerned, in other words, on the same carrier wave it is possible for up to 16 mobile stations to communicate simultaneously.

In the last few years, the need for high-speed data services in mobile communication networks has remarkably increased. Data transfer rates of at least 64 kbit/s would be needed to utilize, for example, ISDN (Integrated Services Digital Network) circuit switched digital data services. PSTN data services of the public telephone network, such as modems and telefax terminals of class G3, require faster transfer rates, such as 14.4 kbit/s. One of the growing areas of mobile data transfer requiring higher transfer rates is the mobile video service. As examples of these kinds of services, security control by cameras and video databases can be mentioned. The minimum data transfer rate in video transfer can be, for example, 16 or 32 kbit/s.

The data transfer rates of the present mobile communication networks are not, however, sufficient to satisfy these kinds of new needs.

SUMMARY OF THE INVENTION

It is an object of the present invention to enable higher data transfer rates in mobile communication networks.

The object is achieved in a mobile telecommunications system, of the type illustrated in the introductory section, by a method which according to the present invention is characterized by splitting a high-speed data signal into two or more signals of lower speed prior to a transmission over the radio path, allocating, for high-speed data transmission, a mobile station, at least two time slots from each frame corresponding to the number of said signals of lower speed, transmitting each data signal of lower speed in a different one of the time slots.

The invention further relates to an arrangement for high-speed data transmission in a mobile telecommunications system in which data is transmitted over the radio path between a mobile station and a base station as bursts in time slots allocated to a mobile station by successive frames. According to the invention, it is characteristic of the arrangement that it comprises means for splitting a data signal, whose speed is higher than the maximum data transfer rate in a time slot, into two or more signals of lower speed prior to transmission over the radio path, and that a mobile station is allocated two or more time slots in each successive frame for high-speed data transmission so that each of said signals of lower speed is transmitted over the radio path in its respective time slot, and means for combining the signals of lower speed received over the radio path.

The invention employs a so-called multi-slot technique so that a mobile station has access to two or more time slots in each frame. The high-speed data signal to be transmitted over the radio path is split into a required number of data signals of lower speed, each signal being transmitted as bursts in a respective time slot. As soon as the data signals of lower speed have separately been transmitted over the radio path, they are again at the receiving end combined into the original high-speed signal. This is how the data transfer rate can be doubled, tripled, etc., depending on whether two, three or more time slots are assigned to be used by a subscriber. In a GSM system, for example, two time slots will enable a data transfer speed of 2×9.6 kbit/s which is enough for a modem of 14.4 kbit/s, or a telefax terminal, for example. Six time slots will enable a data transfer rate of 64 kbit/s.

The multi-slot technique in accordance with the invention, in which a high-speed data signal is transmitted as several bursts in several time slots within one frame, has many advantages over an alternative approach in which a mobile station is also assigned several time slots in the same frame for data transmission, but the whole data signal is transmitted as one burst extended for the time of the assigned time slots. In the present invention, there is no need to change the other significant characteristics of the physical transmission path (radio path, for example, Layer 1 of GSM), such as frequency division, frame format and time slot configuration, data transfer rate, error correction, modulation, format of a TDMA burst, bit error ratio (BER), etc. In other words, by the present invention it is possible to support different kinds of subscriber data transfer rates in the radio system by a single structure of a physical transmission path. Consequently there is no need to support several structures of a physical transmission path by the subscriber terminals.

By handling each of the several time slots as an independent traffic channel, a simple implementation is possible because channel coding, interleaving, burst building and modulation operations can separately be carried out to each signal of lower speed. Thus, carrying out different kinds of channel codings and interleavings which depend on the required data transfer rates can be avoided. The simple embodiment is especially advantageous in cases of the multi-slot technique in accordance with the invention as applied to existing systems, such as GSM.

The implementation may be especially simple if adjacent time slots are employed. Consequently, it will be easier to carry out various measurements on the remaining part of the frame, and to avoid increasing the number of frequency synthesizers in the receiver of the mobile station. In the GSM system, it is especially advantageous to implement the invention by using two time slots.

BRIEF DESCRIPTION OF THE DRAWINGS

In the following, the invention will be described in greater detail by the primary embodiments with reference to the accompanying drawings in which FIGS. 2, 3, 4 and 5 illustrate a TDMA frame format.

DETAILED DESCRIPTION OF THE PREFERRED EMBODIMENTS OF THE INVENTION

The present invention can be applied to high-speed data transmission in most of the digital mobile systems of the TDMA type such as, for example, the Pan-European digital mobile system GSM, DSC1800 (Digital Communication System), UMTS (Universal Mobile Telecommunication System), FPLMTS (Future Public Land Mobile Telecommunication System), etc.

Figure 1:
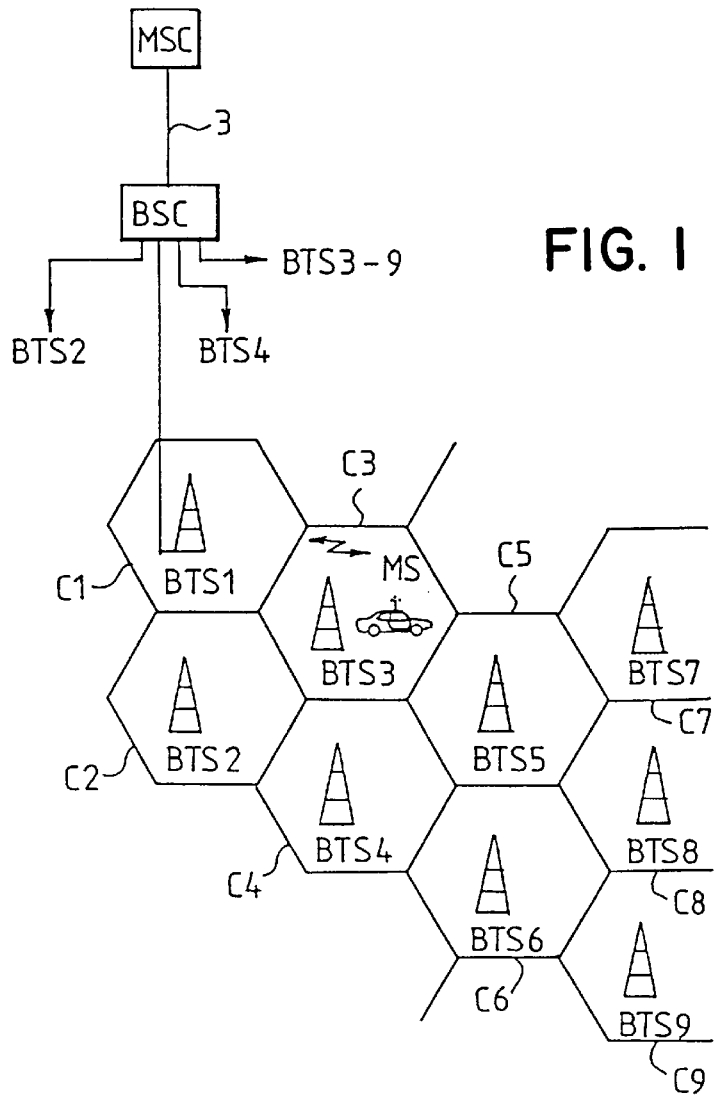
FIG. 1 illustrates a section of a mobile system in which the invention can be applied.

A mobile system of the GSM type is illustrated as an example. GSM (Global System for Mobile Communications) is a Pan-European mobile system. FIG. 1 very briefly illustrates the basic elements of the GSM system without going any further into the details or other subsections of the system. For a closer description of the GSM system, the GSM recommendations and "The GSM System for Mobile Communications", by M. Mouly & M. Pautet, Palaiseau, France, 1992, ISBN: 29507190-0-7 is referred to.

A mobile services switching center MSC handles the connecting of incoming and outgoing calls. It performs functions similar to those of an exchange of a public telephone network (PSTN). In addition to these, it also performs functions characteristic of mobile communications only, such as subscriber location management in co-operation with the subscriber registers of the network. As subscriber registers, the GSM system includes at least the home location register HLR and the visitor location register VLR, which are not shown in FIG. 1. More accurate information of the location of the subscriber, usually the accuracy of the location area, is stored in the visitor location register, there being typically one VLR per each mobile services switching centre MSC, while the HLR knows which VLR area the mobile station MS is visiting. The mobile stations MS are connected to the center MSC by base station systems. The base station system consists of a base station controller BSC and base stations BTS. One base station controller is used to control several base stations BTS. The tasks of the BSC include, among other things, handovers in cases in which the handover is performed within the base station, or between two base stations controlled by the same BSC. FIG. 1 only shows, for reasons of clarity, a base station system in which nine base stations BTS1–BTS9 are connected to a base station controller BSC, the radio coverage area of the base stations forms the corresponding radio cells C1–C9.

The GSM system is a time division multiple access (TDMA) system in which the time division traffic on the radio path takes place in successive TDMA frames each of which consists of several time slots. In each time slot, a short information packet is sent as a radio frequency burst of a finite duration. The burst consists of a number of modulated bits. For the most part, time slots are used for the transmission of control channels and traffic channels. On the traffic channels, speech and data are transmitted. On the control channels, signalling between a base station and mobile subscriber stations is carried out.

Figures 2, 3, 4, 5:
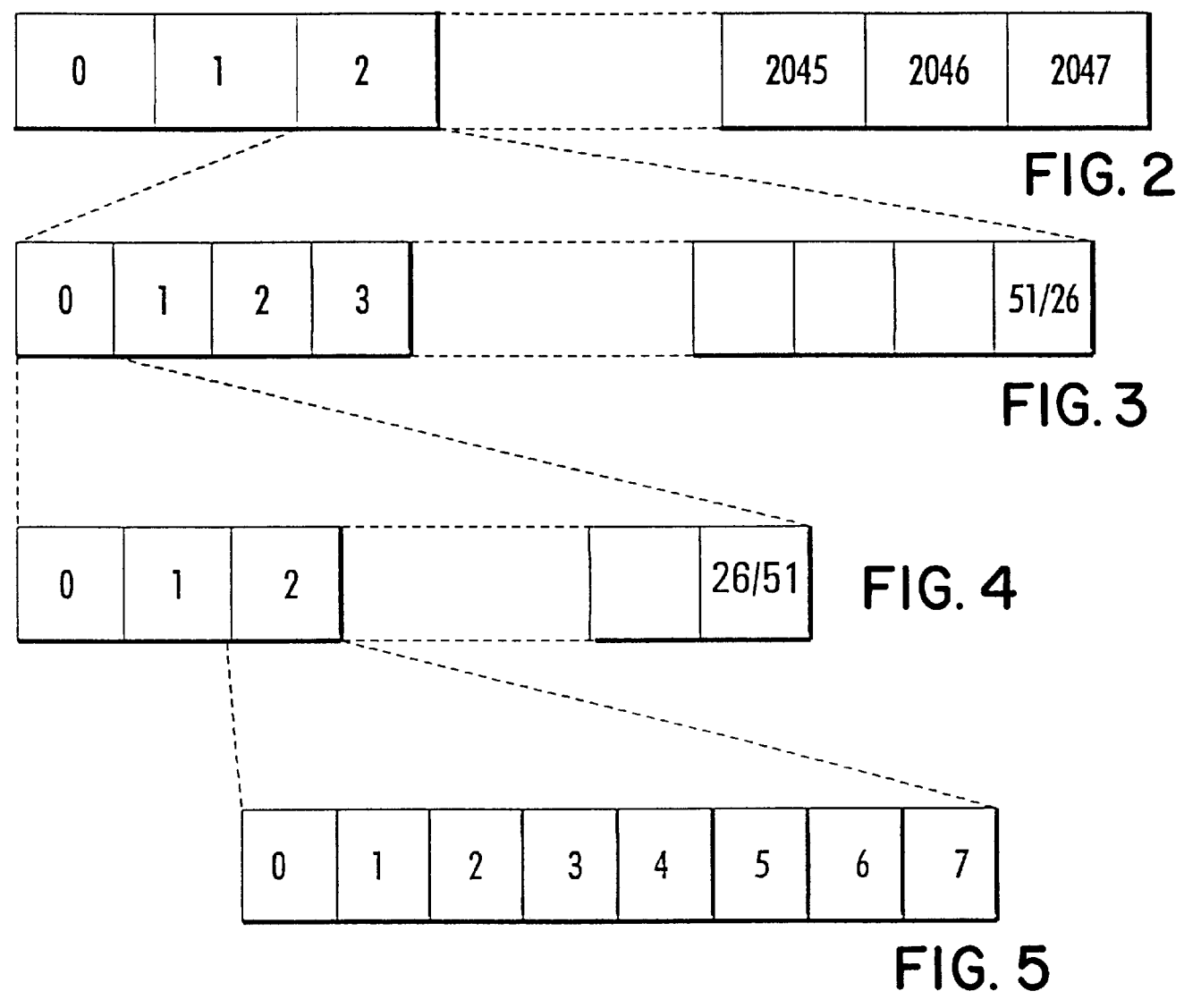

Channel structures used in radio interface of the GSM system are described in closer detail in the ETSI/GSM recommendation 05.02. The TDMA frame format of the GSM system is illustrated as an example in FIGS. 2–5. FIG. 5 illustrates a TDMA basic frame which includes eight time slots 0–7 used as traffic channels or control channels. Thus, only one radio frequency burst shorter than the duration of the time slot is transmitted in each time slot. As soon as one TDMA basic frame ends in time slot 7, the time slot 0 of the next basic frame immediately begins. Thus, 26 or 51 successive TDMA frames form a multiframe depending on whether a traffic channel or a control channel structure is in question, as illustrated in FIG. 4. A superframe consists of 51 or 26 successive multiframes depending on whether the multiframes have 26 or 51 frames, as illustrated in FIG. 3. A hyperframe is formed of 2048 superframes, as illustrated in FIG. 2. The hyperframe is the biggest successive frame unit whose ending starts a new, similar hyperframe.

Figure 6:
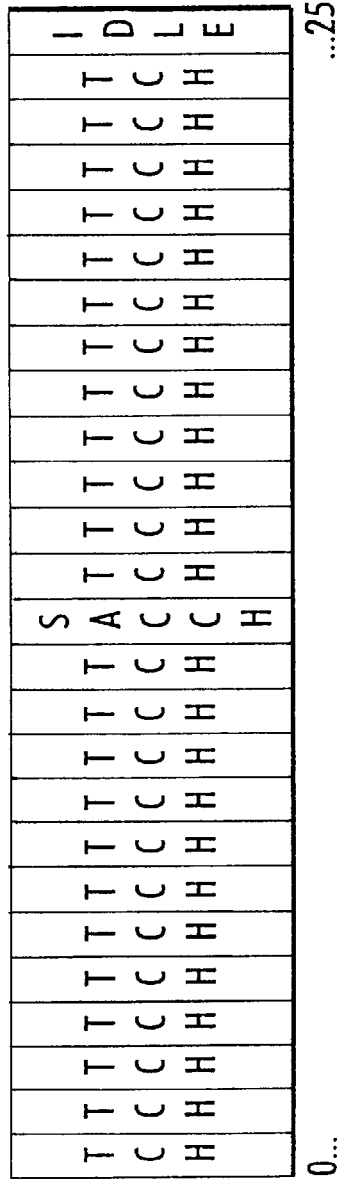
FIG. 6 illustrates a TCH/F+SACCH multiframe.
Figure 7:
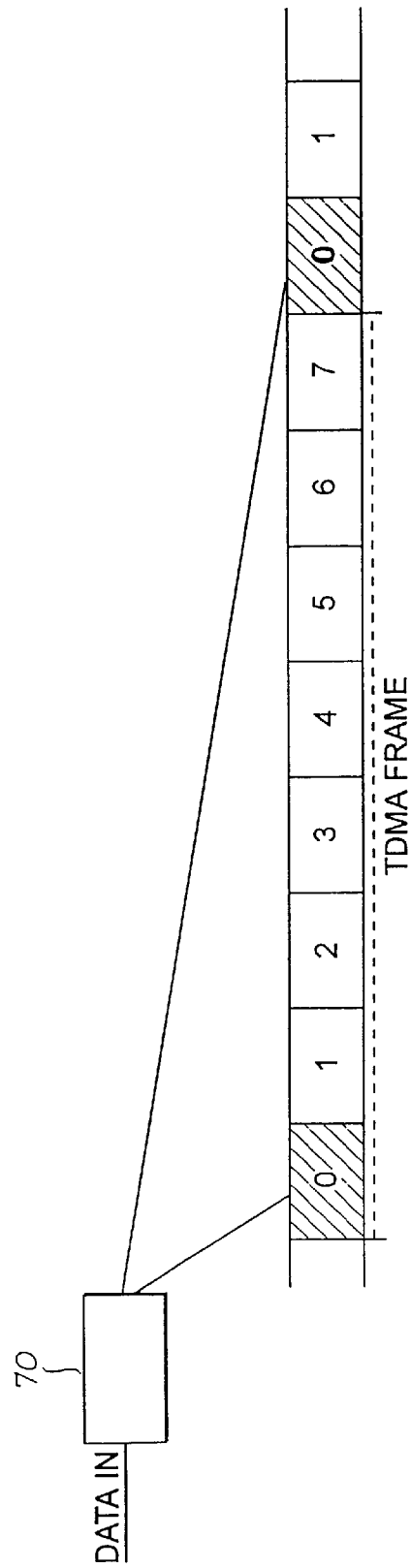
FIG. 7 illustrates a conventional data transmission in one time slot.

FIG. 6 illustrates a structure of a full-speed traffic channel TCH/F-SACCH/TF defined by the recommendation. The structure a multiframe includes 24 full-speed traffic channel frames TCH, one parallel control channel frame SACCH and a dummy frame IDLE. In each time slot assigned to be used as traffic channels, the control channel SACCH and a dummy time slot are repeated every 26 time slots. The positions of the frames SACCH and IDLE are different for time slots 0, 2, 4 and 7 than for time slots 1, 3, 5, and 7. What is illustrated in FIG. 7 is valid for time slots 0, 2, 4 and 6. In time slots 1, 3, 5 and 7, frames IDLE and SACCH exchange places. The control channel SACCH is used for reporting the measurement results from the mobile station to the fixed radio network, and for controlling of the mobile station, for example, power adjustment, from the fixed radio network.

In normal operation, at the beginning of a call a mobile station MS is assigned one time slot from a carrier wave as a traffic channel (single slot access). The mobile station MS synchronizes into this time slot to transmit and receive radio frequency bursts. In FIG. 7, for example, a mobile station MS is locked to the time slot 0 of a frame. Channel coding, interleaving, burst formation, and modulation 70 are carried out to the data to be transmitted DATAIN, after which the radio frequency burst is transmitted in the time slot 0 of each TDMA frame. In the remaining part of the frame, the MS carries out various kinds of measurements, as will be described below.

In accordance with the invention, a mobile station MS requiring data transmission of higher speed than one traffic channel can offer, is assigned two or more time slots from the same frame.

The multi-slot technique according to the invention requires certain additional features in the signalling in connection with traffic channel allocation. During the call set-up time, assigning a traffic channel to a mobile station is carried out by an assignment command which is transmitted to the mobile station by the fixed network. This message must contain the data of all the traffic channels that are assigned to a mobile station MS for high-speed data transmission according to the invention. Already by now, the GSM system must be able to address two half-speed traffic channels in the same assignment command, which is why the message contains descriptions and modes for both the first as well as the second traffic channel. The present assignment command can easily be expanded to cover the addressing of at least two time slots, i.e. full-speed traffic channels. An assignment command is described in the GSM recommendation 04.08, version 4.5.0, June 1993, pp. 168–170. Channel addressing in accordance with the invention can be performed in the assignment command data elements Mode of first channel, mode of second channel, and Channel Description Information element, which are described in greater detail in the GSM recommendation 04.08, version 4.5.0, June 1993, pp. 316–350. For addressing more than two time slots, a new message must be determined. Due to the fact that all the channels addressed are of the same type of channel, TCH/F, the message can be limited to describe the type of the first channel and then the total number of channels required. In such a case, the message would be rather short and simple.

Correspondingly, in case of a handover, the handover command must be able to address two or more time slots in the same frame. In the GSM system, the handover command contains the same data fields as described above in connection with the assignment command, and thus it can be applied to the requirements of the invention with similar changes. The handover command is described in the GSM recommendation 04.08, version 4.5.0, June 1993, pp. 184–189.

A second alternative is to employ a dedicated assignment command for each time slot.

In both cases, both outgoing and incoming call set-up messages (SETUP) of a mobile station must contain information about the actual channel requirements, in other words, the number of time slots needed. This information may be included in the Bearer Capability Information element BCIE. The BCIE is described in the GSM recommendation 04.08, version 4.5.0, pp. 423–431.

Figure 8:
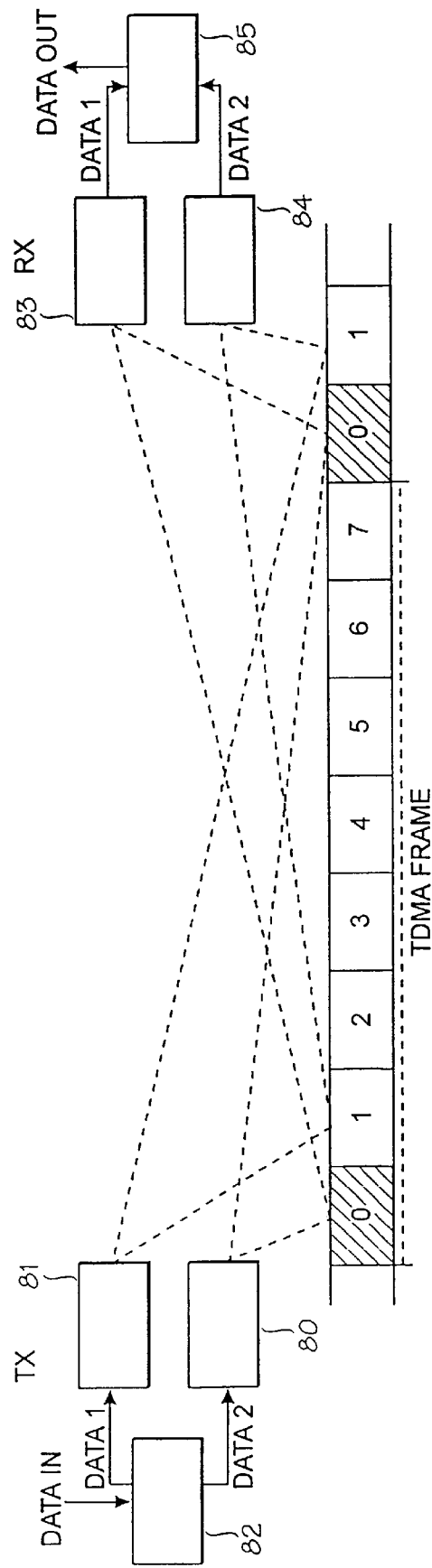
FIG. 8 illustrates data transmission in accordance with the invention in two time slots.

FIG. 8 shows an example in which a mobile station MS is assigned successive time slots 0 and 1 from the same TDMA frame. A high-speed data signal DATAIN to be transferred over the radio path is split in the divider 82 into a necessary number of data signals of lower speed DATA1 and DATA2. Channel coding, interleaving, burst formation and modulation 80, and, correspondingly, 81, are separately carried out for each data signal of lower speed DATA1 and DATA2, after which each data signal is transmitted as a radio frequency burst in its dedicated time slot 0 and 1, respectively. As soon as the lower speed data signals DATA1 and DATA2 are separately transmitted over the radio path, demodulation, deinterleaving and channel decoding 83 and, correspondingly, 84, of the signals are separately performed at the receiving end, after which the signals DATA1 and DATA2 are combined into the original high-speed signal DATAOUT in the combiner 85 at the receiving end.

On the fixed network side, the functions of blocks 80, 81, 83, 84 of FIG. 8, in other words, channel coding, interleaving, burst formation and modulation, and, correspondingly, demodulation, deinterleaving and channel decoding are located advantageously at the base station BTS. The base station BTS has a separate, parallel handling for each time slot. The divider 82 and the combiner 85 can, in turn, be assigned, as needed, to any network element such as a base station BTS, a base station controller BSC, or a mobile services switching centre MSC. In cases where the divider 82 and the combiner 85 are located in another network element than the base station BTS, the data signals of lower speed DATA1 and DATA2 are transmitted between that element and the base station BTS similarly to signals on normal traffic channels.

In a fixed network of the GSM system, various functions relating to speech coding and rate adaptation are concentrated in a TRCU (Transcoder/Rate Adaptor Unit). The TRCU may be located in several alternative places in the system according to choices made by the manufacturer. Typically, the TRCU is placed at the mobile services switching centre MSC, but it may also be a part of a base station controller BSC or a base station BTS. In cases the TRCU is placed apart from a base station BTS, information is transmitted between the base station and the transcoder/rate adaptor unit TRCU in so-called TRAU frames. The function of the transcoder/rate adaptor unit is defined in the GSM recommendation 08.60. A combiner 85 and a divider 83 in accordance with the invention may be placed with this transcoder/rate adaptor unit TRCU.

In a mobile station MS, the blocks 80, 81, 83 and 84 of FIG. 8, in other words, channel coding, interleaving, burst formation and modulation, and, correspondingly, demodulation, deinterleaving and channel decoding, are advantageously implemented by a processing unit common to all time slots, at least in an embodiment of two time slots.

The use of two adjacent time slots in the same frame results in the simplest implementation of a mobile station MS due to, above all, the number of frequency synthesizers needed. This can be illustrated by FIGS. 9 and 10.

Figure 9:
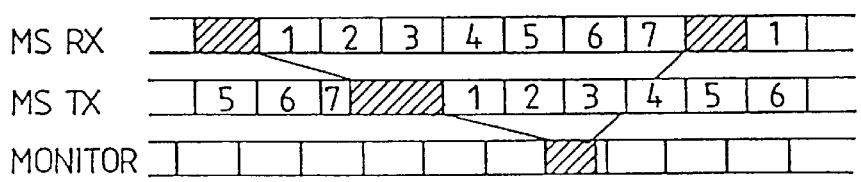
FIG. 9 illustrates the timing of transmission, reception and measurements in a data transmission of one time slot.

In FIG. 9, a mobile station is in a normal manner locked in the time slot 0 of a frame, and carries measurements during the other time slots. Between the downlink direction (BTS to MS) and the uplink direction (MS to BTS) there is an offset of three time slots in the time slot numbering so that reception is not interfered with by the mobile station's own transmission. Transmitting time (TX) of approximately 1.5 time slots is shown. This is due to the fact that the actual transmission can take place within this range depending on the timing advance used for compensating the transmission delay caused by the distance between the base station and the mobile station. There are at least 1.5 time slots between transmission and reception (RX) in order to leave an adequate settling time for the MS frequency synthesizer which generates local oscillator signals for transmission and reception. This means that only one frequency synthesizer is required for transmission and reception.

Figure 10:
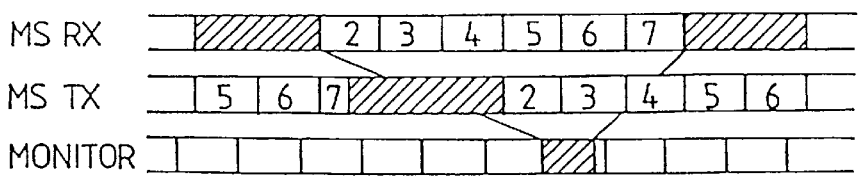
FIG. 10 illustrates the timing of transmission, reception and measurements in a data transmission of two time slots.

FIG. 10 shows a case in which a mobile station MS is assigned two adjacent time slots in each frame for high-speed data transmission according to the present invention. A second time slot 1 immediately follows the first time slot in both RX and TX directions. By placing two time slots in succession like this, it is ensured that RX and TX operations do not overlap by which distinct advantages can be achieved. A frequency synthesizer would not, however, have enough time to settle between all the TX and RX operations, which means that separate frequency synthesizers are required, one for receiving and one for transmitting, unless very fast frequency synthesizers are employed.

In cases in which the number of time slots increases to more than two, RX and TX operations do overlap and full duplex filtering is required. As a result, the measurement moment can be set more freely, which is why two frequency synthesizers are still adequate for three or four time slots, possibly even five, as the same synthesizer can be used for both reception and measuring operations. An implementation of six time slots already requires separate frequency synthesizers for reception as well as measuring operations, unless very fast frequency synthesizers are employed.

The figures and the explanation in connection with them are only meant to illustrate the present invention. The method and arrangement in accordance with the invention may vary within the scope of the attached claims.

We claim:

1. A method for high-speed data transmission in a mobile telecommunications system, comprising:

splitting a high-speed data signal into at least two signals of lower speed prior to a transmission over a radio path;

allocating, for high-speed data transmission, for a mobile station at least two time slots from each frame corresponding to a number of said at least two signals of lower speed;

carrying out modulation and burst building operations separately to each of said at least two signals of lower speed; and transmitting data over the said radio path between a mobile station and a base station as bursts in a time slot allocated to the said mobile station by successive frames, so that each of said at least two data signals of lower speed is transmitted in a different one of the said at least two time slots.

2. A method as claimed in claim 1, wherein said allocating allocates for said mobile station adjacent ones of said at least two time slots in a frame.

3. A method as claimed in claim 1, wherein said splitting comprises splitting a data signal to be transmitted to a mobile station into signals of lower speed at a base station.

4. A method as claimed in claim 1, wherein said splitting comprises splitting a data signal to be transmitted to a mobile station into signals of lower speed at a location other than said base station, and transmitting said data signal to said base station as signals of lower speed.

5. An arrangement for high-speed data transmission in a mobile telecommunications system in which data is transmitted over a radio path between a mobile station and a base station as bursts in time slots allocated to said mobile station by successive frames, said arrangement comprising:

means for splitting a data signal, having a speed being higher than a maximum data transfer rate in a time slot, into at least two signals of lower speed prior to transmission over said radio path;

means for performing burst formation and modulation operations separately to each of said at least two signals of lower speed;

means for performing demodulation operation separately for each of said at least two signals of lower speed; and means for combining said at least two signals of lower speed received over said radio path, wherein said mobile station is allocated at least two time slots in each successive frame for high-speed data transmission so that each of said at least two signals of lower speed is transmitted over said radio path in a respective time slot.

6. An arrangement as claimed in claim 5, wherein said mobile station is arranged to be allocated adjacent ones of said at least two time slots in a frame.

7. An arrangement as claimed in claim 5, wherein said means for combining and said means for dividing are placed at said base station and said mobile station.

8. An arrangement as claimed in claim 5, wherein said arrangement further comprises a mobile services switching center, and said means for combining and said means for dividing are placed at said mobile services switching center and said mobile station.

9. An arrangement as claimed in claim 5, further comprising a transcoder, and wherein:

said a mobile telecommunications system is a GSM system, and said means for combining and dividing are placed at said transcoder and said mobile station.

10. An arrangement as claimed in claim 5, wherein said base station comprises means for performing channel coding, interleaving, burst building and modulation operations separately to each of said at least two signals of lower speed.

11. An arrangement as claimed in claim 5, wherein said mobile station comprises means, common to all signals of lower speed, for channel coding, interleaving, burst building and modulation operations.

12. A method for high-speed data transmission over an air interface between a mobile station and a fixed mobile communication network in a digital mobile communication system, said method comprising:

splitting a high-speed data signal into at least two signals of lower speed in said mobile communication network at a location remote from a serving base station;

transmitting said at least two signals of lower speed to said serving base station;

allocating, for high-speed data transmission, for a mobile station at least two time slots from each frame, a number of said at least two time slots corresponding to a number of said at least two signals of lower speed;

carrying out channel coding, interleaving and modulation operations separately to each one of said at least two signals of lower speed at a transmitting end; and transmitting each of said at least two signals of lower speed in a different one of said at least two allocated time slots over a radio path from said serving base station to said mobile station.

13. An arrangement for high-speed data transmission in a mobile telecommunications system over a radio path between a mobile station and a base station, said arrangement comprising:

means for splitting a high-speed data signal, having a speed higher than a maximum data transfer rate of one traffic channel, into at least two signals of lower speed in said mobile telecommunications system at a location remote from said base station;

means for transmitting said at least two signals of lower speed to said base station;

said mobile station being allocated at least two time slots for high-speed data transmission so that each of said at least two signals of lower speed is transmitted over said radio path in a respective one of said at least two time slots;

means for performing channel coding, interleaving and modulation operations separately to each one of said at least two signals of lower speed at a transmitting end;

means for transmitting each of said at least two signals of lower speed in a different one of said at least two allocated time slots over said radio path from said base station to said mobile station; and means for performing demodulating, deinterleaving and channel decoding operations separately to each one of said at least two signals of lower speed at a receiving end.

* * * * *